Patented Mar. 2, 1954

2,671,086

UNITED STATES PATENT OFFICE 2,671,086

3,6-DICHLORO AND 3,6-DIBROMO-PYRIDAZINES

Margaret M. Rogers and Jackson P. English, Stamford, Conn., assignors to American Cyanamid Company, New York, N. Y., a corporation of Maine No Drawing. Application June 22, 1951, Serial No. 233,100

3 Claims. (Cl. 260—250)

This invention relates to new 3,6-dihalopyridazines and methods of preparing the same. These new compounds may be represented by the following structural formula:

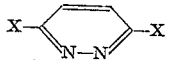

in which X represents halogen, for instance chlorine or bromine.

The new compounds of this invention are useful in many phases of organic syntheses since the two halogen groups are highly reactive and either or both may readily be replaced. Many useful compounds may be prepared by such reactions. For instance, the new 3,6-dihalopyridazines of this invention may readily be employed in the syntheses of compounds such as 3-sulfanilamidopyridazine which have therapeutic activity.

While it is not intended that this invention be limited by theory, it is believed that the unusual activity of the halogen groups is due to the hetorocyclic nitrogen atoms in the ring. As will be noticed from the above formula each of the halogen substituted carbon atoms is adjacent to a nitrogen atom in the ring structure and in compounds where such an arrangement is lacking, high reactivity of the halogen groups is not obtained. An interesting characteristic of the new compounds is that one of the halogen groups may readily be replaced without reaction of the second halogen group. The second halogen substituent may then be replaced in an entirely different type of reaction and in this way complex compounds may be readily prepared.

While it is not intended that this invention be limited to dihalopyridazines produced in any particular manner, a convenient method of preparing the new compounds has been discovered and it is intended that this new method also constitute a part of the invention. The new method comprises contacting maleic hydrazide with a halogenating agent. This new reaction may be more clearly illustrated by the following equation:

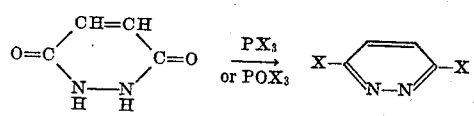

in which X is as defined above.

Suitable halogenating agents for the new process of this invention are the phosphorus pentahalides and the phosphorus oxyhalides. For instance in preparing 3,6-dichloropyridazine one may employ phosphorus pentachloride or phosphorus oxychloride and in preparing 3,6-dibromopyridazine one may employ phosphorus pentabromide or phosphorus oxybromide. It is usually advantageous to employ an excess of the halogenating agent as this results in higher yields and facilitates the isolation of the reaction product. If the halogenating agent is a liquid such as phosphorus oxychloride the preferred procedure comprises simply dispersing the maleic hydrazide in an excess of the same, and if the halogenating agent is a solid such as phosphorus oxybromide the preferred procedure comprises mechanically mixing maleic hydrazide with an excess of the chlorinating agent and heating until the mixture becomes liquid. Of course, a solvent or diluent such as xylene or ethylene chloride may be employed if desired.

The new process of this invention may be performed over a relatively wide range of temperatures, for instance from about 70° C. up to the refluxing temperature of the chlorinating agent or even higher, with temperatures in the range of from about 90° C. to 110° C. being preferred. The action is exothermic and once an operating temperature has been obtained, the heat of the reaction is usually sufficient to maintain the reaction mixture within a desirable temperature range. The reaction is substantially complete in only a short time, for instance from ten to thirty minutes.

The invention will be more particularly illustrated by the following specific examples in which all parts are by weight unless otherwise indicated.

*Example I*

A slurry of one part of maleic hydrazide in 7.1 parts of phosphorus oxychloride is stirred for fifteen minutes at room temperature and then heated to 90° C. Heating is discontinued at this point as the heat of reaction is sufficient to maintain the reaction at this temperature. After about twenty minutes the reaction is substantially complete and excess phosphorus oxychloride is removed by vacuum distillation. The resulting oily residue is drowned in ice water which results in the appearance of a copious tan precipitate. This mixture is made alkaline by the gradual addition of concentrated ammonium hydroxide and the mixture is then extracted to exhaustion with ether. The ether solution is dried by treatment for about sixteen hours with calcium sulfate at 8° C. and is then filtered and concentrated to a small volume by evaporation of solvent. The remaining concentrated solution is distilled in a vacuum and a fraction boiling at 123° C. to 127° C. at 8 mm. pressure is collected. This 3,6-dichloropyridazine has a melting point of about 66° C. to 68° C.

An equal weight of phosphorus pentachloride can be substituted for the phosphorus oxychloride in the above example with equally satisfactory results by simply forming a mechanical mixture of the maleic hydrazide and the phosphorus pentachloride. Such a mixture when heated becomes fluid at a temperature considerably below the melting point of phosphorus pentachloride due to the formation of liquid reaction by-products and, therefore, reaction temperatures as employed above or slightly higher are quite satisfactory. Likewise, phosphorus oxybromide or phosphorus pentabromide can be substituted for the phosphorus oxychloride of the above example for the production of 3,6-dibromopyridazine.

*Example II*

The following example is for the purpose of demonstrating the utility of the new compounds of this invention in preparing new and useful products.

1.9 parts of 3,6-dichloropyridazine, 3.4 parts of sulfanilamide, 2.7 parts of potassium carbonate and 1 part of sodium chloride were ground together. The solid mixture was heated with stirring in a wax bath in a round-bottom flask fitted with reflux condenser. As the dichloropyridazine and sulfanilamide melted, the mixture became a slurry. When the bath temperature had reached 170° C. a sudden evolution of $CO_2$ occurred which lasted about five minutes, after which the mixture set in fine granules. When no more $CO_2$ was evolved, the wax bath was removed and the reaction mixture was heated in sufficient water to dissolve and allowed to cool. Unreacted sulfanilamide was collected by filtration. Excess dichloropyridazine was removed from the filtrate by ether extraction. The basic solution was chilled and poured into one-half volume of 1:3 acetic acid. Sufficient hydrochloric acid was added to bring the mixture to pH 4. The crude 3-sulfanilamido-6-chloropyridazine which precipitated was purified by solution in 6 parts of 1:100 ammonium hydroxide, charcoal treatment and precipitation by pouring of the filtrate into dilute acetic acid. This new compound has been found to have physiological activity.

A solution of 1.5 parts of 3-sulfanilamido-6-chloropyridazine in 1 part of 40% sodium hydroxide and 4 parts of water was shaken under an atmosphere of hydrogen for one hour with 0.15 part of 10% platinum-charcoal catalyst and 0.15 part of 10% palladium-charcoal catalyst. The solution was filtered free of catalyst and poured into 3 volumes of 1:8 acetic acid. Product precipitated amounting to 53% of theoretical yield. Additional product was obtained by leaching of the catalyst. These crude materials were purified by heating fifteen minutes with decolorizing carbon in a solution of 20 volumes of 1:100 ammonium hydroxide and precipitation of the filtrate by pouring into acetic acid solution. Total recovery of material melting 187° C. to 188° C. was 86% of theory. This 3-sulfanilamidopyridazine is a known compound which has been previously reported as having sulfanilamide activity.

We claim:
1. The 3,6-dihalopyridazines represented by the formula:

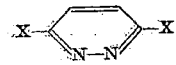

wherein X in each instance represents a member selected from the group consisting of chlorine and bromine.
2. The new compound 3,6-dichloropyridazine.
3. The new compound 3,6-dibromopyridazine.

MARGARET M. ROGERS.
JACKSON P. ENGLISH.

References Cited in the file of this patent

Vaughan et al., Chem. Rev. 43, 465, 475 and 492 (1948).
Gabriel et al., Ber. Deut. Chem. 32, 395 (1899).
Gabriel, Ber. Deut. Chem. 36, 3373 (1903).